April 8, 1930. W. H. CAMFIELD 1,753,645
MACHINE FOR CUTTING BIAS STRIPS
Filed April 18, 1924

INVENTOR
Wm. H. Camfield

Patented Apr. 8, 1930

1,753,645

UNITED STATES PATENT OFFICE

WILLIAM H. CAMFIELD, OF NEWARK, NEW JERSEY, ASSIGNOR OF ONE-HALF TO WALTER PRIOR, OF EAST ORANGE, NEW JERSEY, AND ONE-HALF TO WALTER PRIOR, JR., OF SOUTH ORANGE, NEW JERSEY

MACHINE FOR CUTTING BIAS STRIPS

Application filed April 18, 1924. Serial No. 707,366.

This invention relates to an improved machine for making bias strips by cutting in a helical line around a sleeve of fabric, the machine operating, however, to move the fabric past a stationary knife, the sleeve of fabric being moved longitudinally along, and rotated by, a mandrel.

The invention consists of a machine of this type which has a rotatable mandrel supported at one end, a part of the mandrel being cylindrical and the free end of the mandrel being formed to receive and gradually spread the sleeve so that it is a cylindrical sleeve of fabric by the time it is cut.

The invention is designed to provide also a take-up means which pulls on the strip after it is cut to keep it taut where it is cut and to also cause it to move longitudinally on the mandrel while the mandrel is rotating.

Another object of this invention is to provide a machine of this kind which employs the mandrel for rotating a support for the roll of tubular fabric, the commercial form of such rolls being one with the sleeve rolled flat and the machine turns this roll, the goods being unrolled by the pull of the cut strip on the sleeve of fabric and the mandrel itself turning the support of the roll so that it rotates at substantially the same speed as the mandrel.

This form of machine provides a relatively short travel for the goods from the roll to the point of cutting and does not bind since it rotates with the mandrel and it is thus easily moved longitudinally along the mandrel. The invention also provides a machine which is adapted for cutting various widths of strips from the same size of sleeve or tube of fabric and which also can provide strips cut either on a true bias in which the threads are arranged at 45° relative to the side edges of the strip, or at a greater or less angle when it is necessary to provide strips with a special bias weave.

Figure 1:
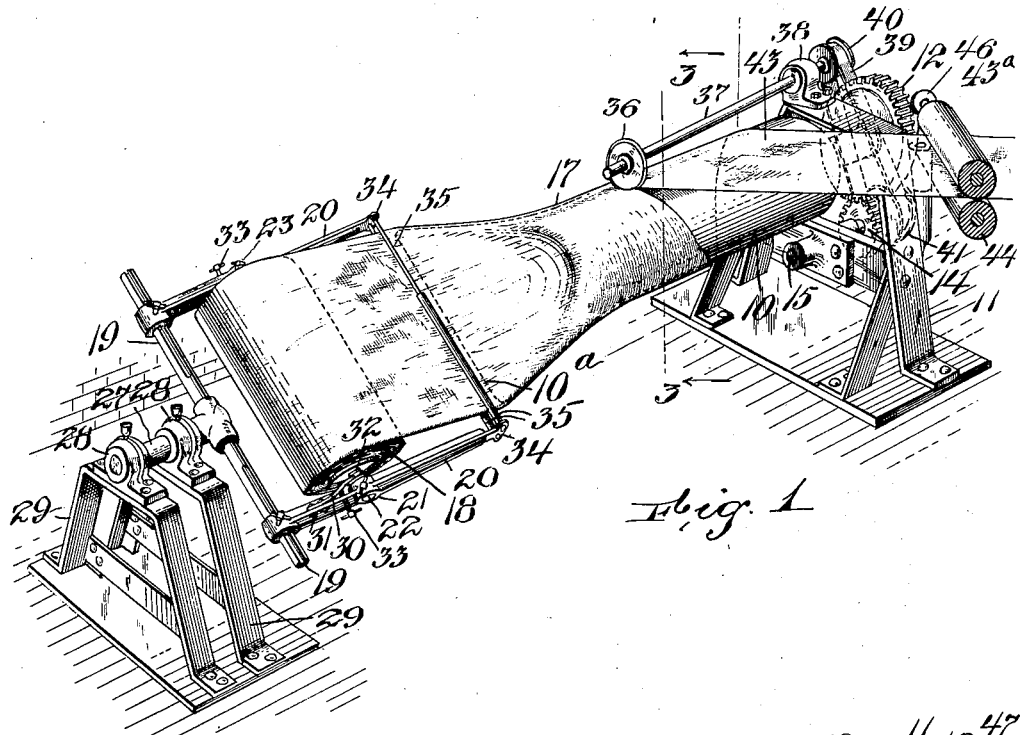
Figure 2:
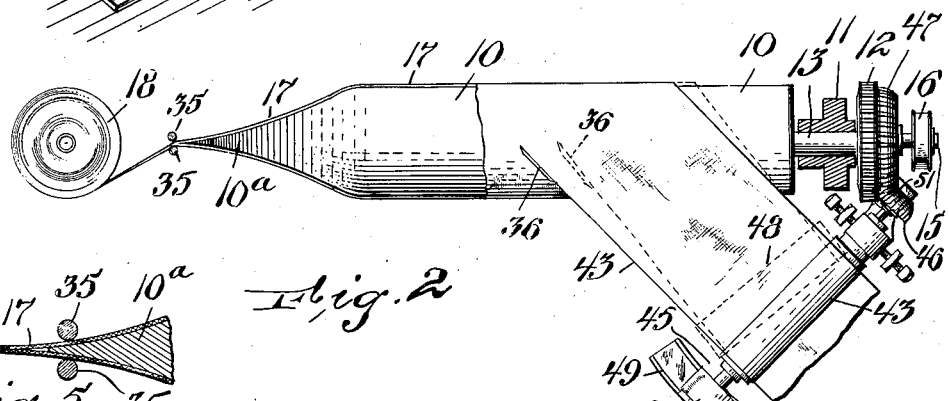
Figure 5:
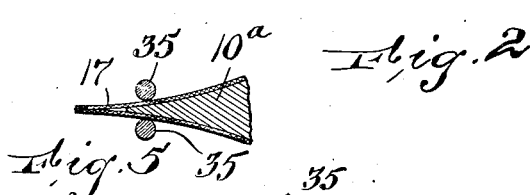
Figure 4:
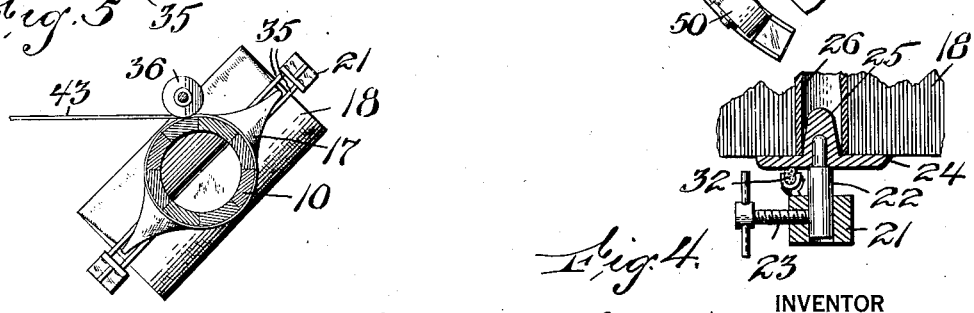
Figure 3:

The invention is illustrated in the accompanying drawing in which Figure 1 is a perspective view of the machine embodying my invention. Figure 2 is a top view with the knife propelling means and with the roll support omitted. Figure 3 is a section on line 3—3 in Figure 1. Figure 4 is a detail section of one of the trunnions for supporting the roll of fabric and Figure 5 is a detail section of the end of the mandrel and of the goods to show a modified form of construction.

In the form of machine illustrated the mandrel is shown at 10 supported at one end in a standard 11 and supported so that it can be rotated. The rotating means shown in the drawing consists of a gear 12 on the shaft 13 which is supported by the standard 11, the gear 12 being propelled by a pinion 14 on the jack-shaft 15, the jack-shaft 15 being shown as being provided with a pulley 16 by means of which it is operated from an outside source of power. The mandrel has its free end formed so that it receives a tube 17 of fabric as it comes from the roll 18 or from any other form in which it is supplied.

The preferred form of this free end of the mandrel is to broaden it and to flatten it to form a fish-tail end 10$^a$ of nearly the width of the sleeve when it is flattened. The roll 18 is supported so that it can unroll freely, the device in which it is supported being rotatable and in the form shown the support comprises a yoke having the end piece 19 and the two arms 20 which have trunnions 21 in which pins 22 are adjustably arranged so that they can take the various widths of roll of goods within certain limits, the pins 22 being held in adjusted position by the screws 23 in the trunnion.

Each pin supports a plate 24 which covers the centre part of the roll 18 and has a tapered finger 25 which fits into the pasteboard tube 26 usually supplied in the commercial roll or tube of fabric. The arm 19 is mounted on a shaft 27 mounted in suitable bearings 28 on the standards 29.

To prevent the roll unwinding when the machine stops, I provide a brake consisting of a spring 30 fastened by rivets 31 or other suitable means and having its free end provided with a pad 32 of felt or the like, the tension being regulated by a screw 33 on each of the arms 20. The arm 20 is extended with its ends 34 supporting parallel rods 35 spaced apart to permit the fabric to pass between them and when the support is constructed to provide various widths of rolls, the rods 35 are made telescopic as shown in Figure 1.

The sleeve of fabric as it passes along the mandrel is cut by a suitable knife and I show in the drawing a knife 36 mounted on a shaft 37 and preferably adjustable thereon so that the width of the strip can be varied, the shaft 37 being supported in a bearing 38 and driven by a belt 39 passing over the pulley 40 on the shaft 37 and over the pulley 41 on the shaft 15. This mechanism provides for a rotating knife but a stationary knife for any other form can be used if desired.

After the fabric has passed the knife and has been cut it forms a strip 42 which is kept taut by a take-up means which, in the form shown, consists of two rollers 43ª and 44 usually geared together as at 45, these rollers being usually made with a covering of rubber so as to provide a good grip on the material. One of the rollers as 43ª, is driven by a gear 46 in mesh with the gear 47.

The gears in the drawing are constructed so that they will be in mesh even although the take-up means, which is arranged at an angle to the mandrel, can be swung to assume a different angle as shown in dotted outline at 48 in Figure 2. To provide for such adjustment I show a track 49 for the outer bearing 50 of the take-up means, the whole structure swinging on a centre shown at 51, which has its centre in line with the point where the gears 46 and 47 mesh.

The mandrel is made light in weight, either of wood or it can be made of sheet metal, and as it revolves it carries with it the sleeve of fabric and the fish-tail end of the mandrel being contiguous to the support of the roll of goods it causes this supporting means to rotate with the mandrel so that the goods, without any appreciable amount of wrinkling, passes from flat form on the roll to the flattened end of the mandrel and then to a cylindrical shape on the cylindrical part of the mandrel and is then cut.

The take-up means assists in the rotation of the mandrel by pulling on the goods but being arranged at an angle to the mandrel the cut strip 43 acts on that part of the sleeve that follows to pull it longitudinally along the mandrel and the more obtuse the angle of the take-up means relative to the mandrel, so much greater will be the longitudinal pull on the fabric.

If desired, the mandrel can positively rotate the fabric roll supporting means by having its end 10ª extended as shown in Figure 5 so that it projects slightly between the rods 35.

The rods 35 are arranged so that they are in line with the centre or axis of the roll 18 so that the sleeve of fabric approaches the flattened end of the mandrel in line with its broad edge without regard to the size of the roll 18. In other words, whether the roll is a big roll or is nearly exhausted and has been reduced to a very small diameter, the goods coming out between the arms 35 is substantially in line with the centre of the mandrel. This equalizes the pulling or turning strain equally to both sides of the broad end of the mandrel.

It will be understood that various modifications can be made without departing from the scope of the invention.

I claim:

1. A machine for cutting bias strips comprising a rotatable cylindrical mandrel fixed against longitudinal movement and adapted to occupy and rotate with it a sleeve of fabric, a knife to cut said fabric to form a strip, and take-up means for pulling on the strip as it comes from the knife and to cause the sleeve to move longitudinally on the mandrel.

2. A machine for cutting bias strips comprising a rotatable cylindrical mandrel fixed against longitudinal movement and adapted to occupy and rotate with it a sleeve of fabric, a knife to cut the fabric and a take-up means arranged at an angle to the mandrel to pull the cut strip and to cause the sleeve to move longitudinally on the mandrel.

3. A machine for cutting bias strips comprising a rotatable mandrel fixed against longitudinal movement and a means for rotatably supporting a roll of tubular fabric at one end of the mandrel, said fabric being fed over the mandrel, means for rotating the mandrel whereby the roll of fabric is rotated, a knife to cut the sleeve into a strip and a take-up means for pulling the strip as it comes from the knife and to cause the fabric to be unrolled and to move longitudinally on the mandrel.

4. A machine for making bias strips comprising a rotatable cylindrical mandrel supported at one end and with its free end flattened, means for rotatably supporting a roll of tubular fabric at said free end so that when the sleeve is drawn from the roll to the mandrel the supporting means is rotated with the mandrel, a knife for cutting the sleeve to form a strip, and take-up means for pulling on the strip to cause the sleeve to travel longitudinally along the rotating mandrel.

5. A machine for making bias strips comprising a cylindrical mandrel, means for supporting the mandrel on one end, means for rotating the mandrel, a knife to cut fabric on the mandrel, a take-up means at an angle to the mandrel and a rotatable support for a roll of tubular fabric, said support and free end of the mandrel being contiguous so that when fabric is passing from the roll to the mandrel the mandrel and said support rotate together.

6. A machine for making bias strips comprising a rotatable support for a roll of tubular fabric, a mandrel with its end contiguous to the roll support and adapted to receive the fabric in flat form and change it in form to a tubular sleeve, means for rotating the mandrel, and a knife for cutting the tubular sleeve to form a strip.

7. A machine for making bias strips comprising a mandrel rotatably secured at one end, a yoke with means for holding a roll of fabric, the yoke being rotatable with its centre of rotation substantially in line with the centre of rotation of the mandrel, the free end of the mandrel being contiguous with the yoke so that when the fabric from the roll is passed over the mandrel and the mandrel is rotated, the yoke is rotated with it, and a knife for cutting the fabric as it is rotated on the mandrel.

8. A machine for making bias strips comprising a mandrel of a broad flat form on one end and merging into a cylindrical part, a knife alongside the cylindrical part and a take-up means at an angle to the mandrel and adapted to pull a strip from the mandrel as it leaves the knife.

9. A machine for cutting bias strips from sleeves of fabric, comprising a mandrel over which the sleeve is passed both longitudinally and rotatably and having a part on which the sleeve is cut and means in extension of the aforesaid part of the mandrel for turning the sleeve of fabric as it approaches the mandrel.

10. A machine for cutting bias strips from sleeves of fabric, comprising a cylindrical mandrel on which the sleeve is cut, a knife to so cut the sleeve, and means extending beyond the cylindrical part for turning the sleeve as it is fed.

11. A machine for cutting bias strips from sleeves of fabric, comprising a cylindrical mandrel on which the sleeve is cut, a knife to so cut the sleeve, and a widened portion in extension of the cylindrical part for engaging the inside of the sleeve and turning it.

12. The combination of a mandrel for receiving a sleeve of fabric and a rotatable means for supporting a roll of the fabric, with an extension on the mandrel for engaging the fabric adjacent the roll for causing the rotation of the roll and its supporting means.

In testimony that I claim the foregoing, I have hereto set my hand, this 17th day of April, 1924.

WM. H. CAMFIELD.